United States Patent
Davis

(10) Patent No.: US 7,278,807 B2
(45) Date of Patent: Oct. 9, 2007

(54) LOAD LEVELING SYSTEM FOR ROLL-BACK TRUCKS

(76) Inventor: Rick Davis, 7151 Trappers Ridge, Battle Creek, MI (US) 49014

( * ) Notice: Subject to any disclaimer, the term of this patent is extended or adjusted under 35 U.S.C. 154(b) by 195 days.

(21) Appl. No.: 11/166,948

(22) Filed: Jun. 24, 2005

(65) Prior Publication Data

US 2006/0051176 A1    Mar. 9, 2006

Related U.S. Application Data

(60) Provisional application No. 60/583,260, filed on Jun. 26, 2004.

(51) Int. Cl.
*B60P 3/06* (2006.01)
(52) U.S. Cl. ......................................................... 410/30
(58) Field of Classification Search .................... 410/2, 410/3, 4, 30
See application file for complete search history.

(56) References Cited

U.S. PATENT DOCUMENTS

| | | | | |
|---|---|---|---|---|
| 4,155,678 A | * | 5/1979 | Lehman et al. ............. | 414/483 |
| 4,260,315 A | * | 4/1981 | Bouffard ...................... | 414/469 |
| 4,306,830 A | * | 12/1981 | le Duc ........................ | 414/343 |
| 4,434,872 A | * | 3/1984 | Daniels, Jr. ................. | 187/220 |
| 4,795,303 A | * | 1/1989 | Bubik ......................... | 414/478 |
| 2004/0265083 A1 | * | 12/2004 | Johnson ....................... | 410/30 |

\* cited by examiner

*Primary Examiner*—H Gutman
(74) *Attorney, Agent, or Firm*—Robert M. Downey, PA

(57) ABSTRACT

A system repositions and properly aligns vehicles and other loads on the platform of a roll-back truck during the loading process. Movement devices strategically positioned on the roll-back platform engage the forward and/or rear tires of the vehicle being loaded and move the forward and/or rear end of the vehicle transversely relative to the longitudinal centerline of the platform. Once the position has been adjusted, the vehicle can be pulled forward on the platform to continue the loading process. Transverse adjusted movement of the forward and/or rear end of the vehicle can be made throughout the loading process until the vehicle is fully loaded and properly positioned on the platform of the roll-back truck.

19 Claims, 4 Drawing Sheets

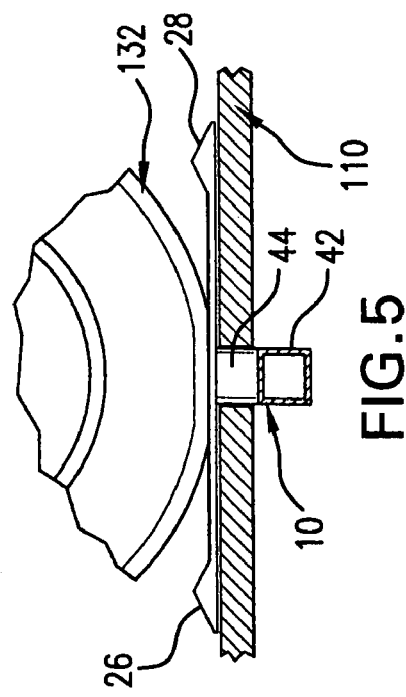
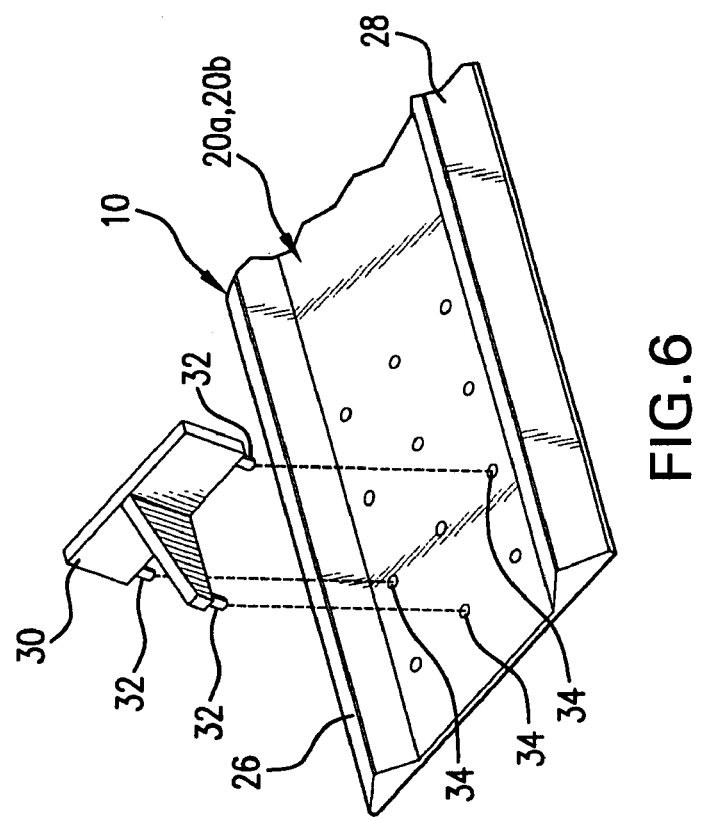
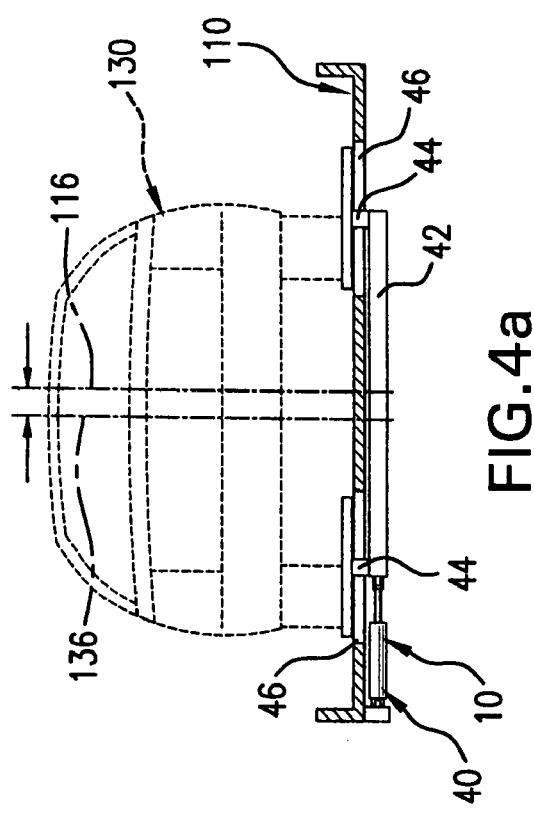
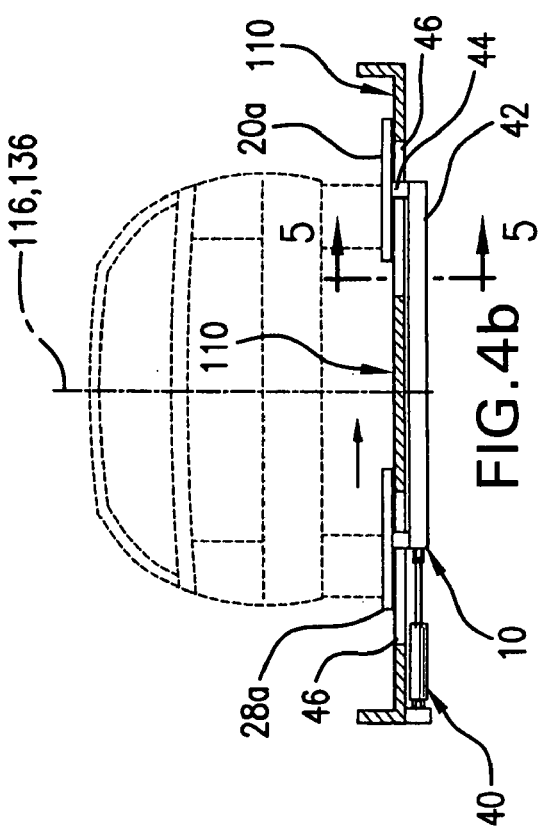

LOAD LEVELING SYSTEM FOR ROLL-BACK TRUCKS

BACKGROUND OF THE INVENTION

This application claims the benefit of provisional application No. 60/583,260, filed Jun. 26, 2004.

1. Field of the Invention

The present invention relates to roll-back vehicle transport systems and, more particularly, to a system for adjusting the position and alignment of a vehicle being loaded on the platform of a roll-back truck during the loading process.

2. Discussion of the Related Art

The two primary types of service trucks used for transporting vehicles, and particularly disabled vehicles, are tow trucks and carriers. Tow trucks ordinarily lift one end of the automobile so that the wheels are raised above the ground. The automobile is then towed by the tow truck with the wheels on the opposite end of the towed vehicle remaining on the ground. Carriers, on the other hand, are able to support the entire automobile (car, small truck, tractor, golf cart, etc.) above the ground on a flat platform or deck. This allows the vehicle to be transported without relying on the wheels of the towed vehicle to roll along the ground surface throughout the towing process, while also eliminating tire wear and possible damage to the towed vehicle.

The most common type of carrier truck uses a moving platform and is often referred to as a "roll-back" truck. On a roll-back truck, the platform is slidable and pivotable relative to the bed frame between a transport position, at which the platform is parallel and forwardly positioned on the bed frame, and a loading position, at which the platform is moved rearwardly and angled relative to the bed frame so that the rear edge of the platform contacts the ground to define an approach angle. A vehicle to be transported on the roll-back truck is pulled forwardly onto the platform with the use of a cable extending from a winch at the forward end of the platform. Ordinarily, the free end of the cable hooks to the underside of the vehicle frame or chassis, usually at the front end, and the winch is operated to wind the cable and pull the vehicle forward along the upwardly angled platform.

Despite the several advantages of roll-back trucks, as compared to tow trucks, there are several drawbacks associated with roll-back trucks, and particularly the loading process. For instance, it is sometimes difficult to position the rear end of the roll-back truck so that the platform is longitudinally aligned with a disabled vehicle to be loaded on the platform. This problem is often encountered along the side of a highway or road which has an embankment with a steep slope. If the disabled vehicle is off the shoulder of the highway and down the embankment, it may be impossible to safely position the roll-back truck on the embankment so that the disabled vehicle is longitudinally aligned with the centerline of the platform. In this situation, it may be necessary to position the platform at an angle relative to the forward moving position of the disable vehicle. Then, as the disabled vehicle is pulled onto the platform, at an angle, it is necessary to shift the forward end of the disabled vehicle to one side or the other in an attempt to straighten the towed vehicle relative to the centerline of the platform as the towed vehicle is continually pulled forward onto and along the platform. Loading a disabled vehicle (e.g. car, truck, tractor, etc.) onto the platform may also be difficult if the forward or rear wheels of the disabled vehicle are damaged or cannot be steered in a manner which allows the disabled vehicle to roll in the desired path when pulled upwardly along the platform.

Presently, shifting the towed vehicle transversely to either side of the centerline of the platform is a laborious and time consuming task which requires attachment and removal of chains to the vehicle in order to pull the vehicle sideways with the use of hand operated jacks. Each time it is necessary to adjust the angle or transverse position of the load, the forward loading operation is interrupted.

Accordingly, there remains a need in the vehicle transport industry for a load leveling system on roll-back trucks. More particularly, there remains a definite need for a system which quickly and efficiently repositions and properly aligns vehicles on the platform of a roll-back truck during the loading process, thereby minimizing the labor and time required to fully load and safely position the vehicle on the platform of the roll-back truck for subsequent transport.

OBJECTS AND ADVANTAGES OF THE INVENTION

With the foregoing in mind, it is a primary object of the present invention to provide a load leveling system for roll-back trucks which repositions and properly aligns vehicles and other loads on the platform of a roll-back truck, while minimizing the time and labor necessary to fully load and safely position the vehicle or other load prior to transport.

It is a further object of the present invention to provide a load leveling system for roll-back trucks which repositions and properly aligns vehicles and other loads on the platform of the roll-back truck during the loading process, and particularly when it is difficult to position the rear end of the roll-back truck so that the platform is longitudinally aligned with the vehicle or other load to be loaded onto the platform.

It is still a further object of the present invention to provide a load leveling system, as described above, which is adapted for retrofit to existing roll-back trucks.

It is still a further object of the present invention to provide a load leveling system, as described above, which is adapted for installation on newly manufactured roll-back trucks.

It is still a further object of the present invention to provide a load leveling system for roll-back trucks, as described above, which is relatively inexpensive, easy to operate and which reduces time and labor necessary to fully load and safely position a vehicle or other load on the platform of a roll-back truck prior to transport.

These and other objects and advantages of the present invention are more readily apparent with reference to the detailed description and drawings.

SUMMARY OF THE INVENTION

The present invention is directed to a system which repositions and properly aligns vehicles on the platform of a roll-back truck during the loading process, while minimizing the time and labor necessary to fully load and safely position the vehicle on the truck platform prior to transport. The system includes wheel movement devices strategically positioned on the roll-back platform. The wheel movement devices engage the forward and/or rear tires of the vehicle being loaded and move the forward and/or rear end of the vehicle transversely relative to the longitudinal centerline of the platform. Once the position of the vehicle is adjusted, the forward loading process can resume. Transverse, adjusted positioning of the vehicle can be made throughout the loading process until the vehicle is fully loaded and safely positioned on the platform.

In a preferred embodiment, the wheel movement devices include slidable plates fitted to the top surface of the platform and strategically positioned to engage the forward and rear wheels of the transported vehicle throughout the loading process. The plates are linked to hydraulic rams or other movement means supported below the platform. Wheel blocks or other means may be removably attached to the plates to engage the sides of the vehicle wheels. The wheel blocks prevent slipping of the wheels on the sliding plates when the plates are moved transversely relative to the longitudinal centerline of the platform in order to move the vehicle to either side of the platform centerline.

Alternatively, the movement device on the platform may include other means, such as rollers, conveyor belts or sliding structures which allow for ease of transverse movement of the forward and/or rear wheels of the transported vehicle relative to the center line of the platform of the roll-back truck.

BRIEF DESCRIPTION OF THE DRAWINGS

For a fuller understanding of the nature of the present invention, reference should be made to the following detailed description taken in conjunction with the accompanying drawing in which:

FIGS. 4a and 4b show a cross-sectional view taken along the line 4-4 of FIG. 1 illustrating a sequence of operation of the load leveling system of the present invention to move a vehicle transversely relative to the centerline of the platform of a roll-back truck in order to straighten and level the load on the platform.

FIG. 5 is an isolated cross-sectional view taken along the line 5-5 in FIG. 4b; and FIG. 6 is a top perspective view, in partial cutaway, illustrating removable attachment of a wheel block to a sliding platform of the load leveling system.

Like reference numerals refer to like parts throughout the several views of the drawings.

DETAILED DESCRIPTION OF THE PREFERRED EMBODIMENTS

Referring to the several views of the drawings, a system for repositioning, properly aligning and leveling a load (e.g. a vehicle) on the platform 110 of a roll-back truck 100 is shown in accordance with various embodiments thereof. Throughout the drawings, the load leveling system is generally indicated as 10.

Figure 1:
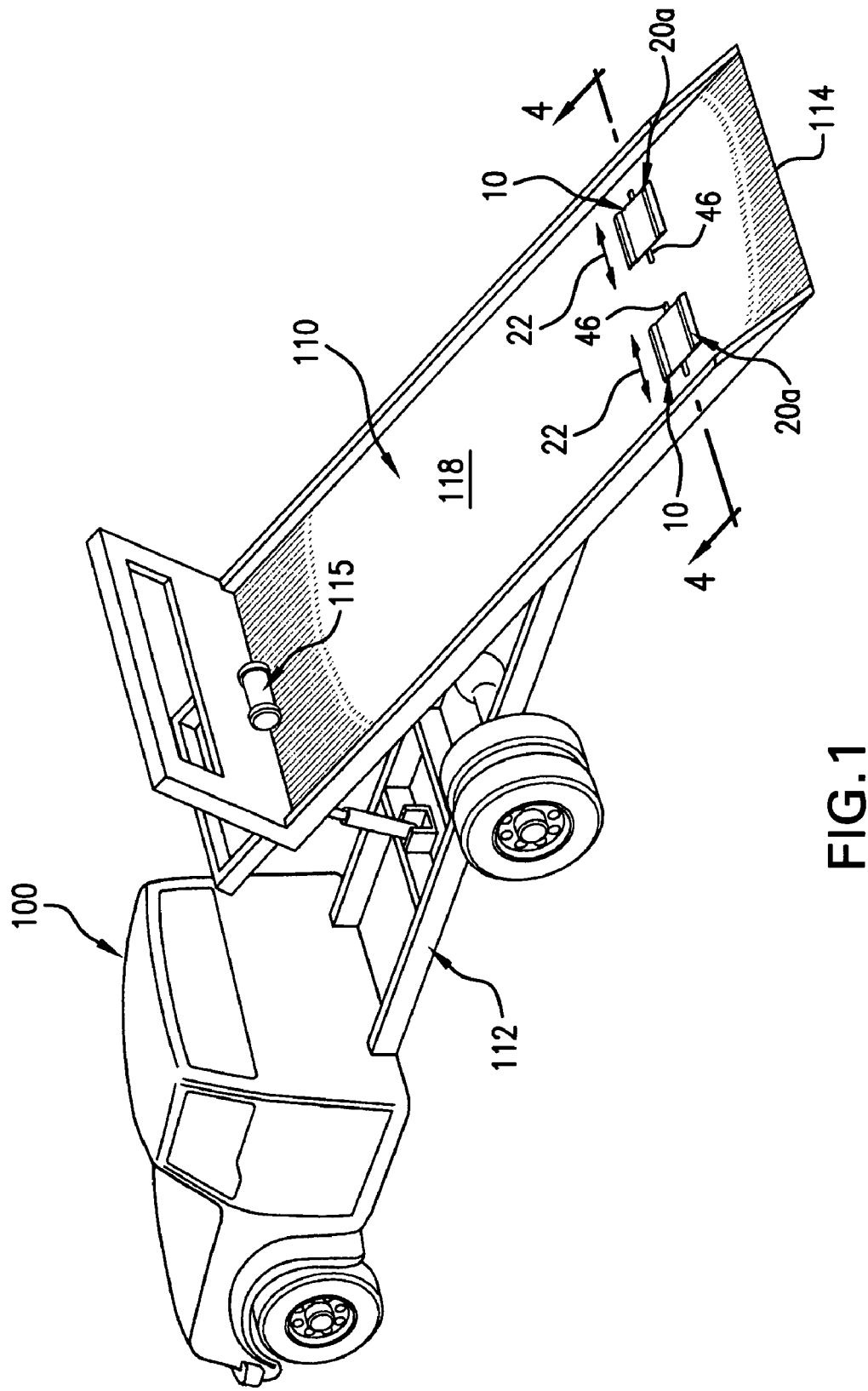
FIG. 1 is a rear perspective view of a roll-back truck shown with the platform in a rearward extended and elevated position for loading or unloading a vehicle thereon, and illustrating one embodiment of the load leveling system of the present invention.
Figure 2:
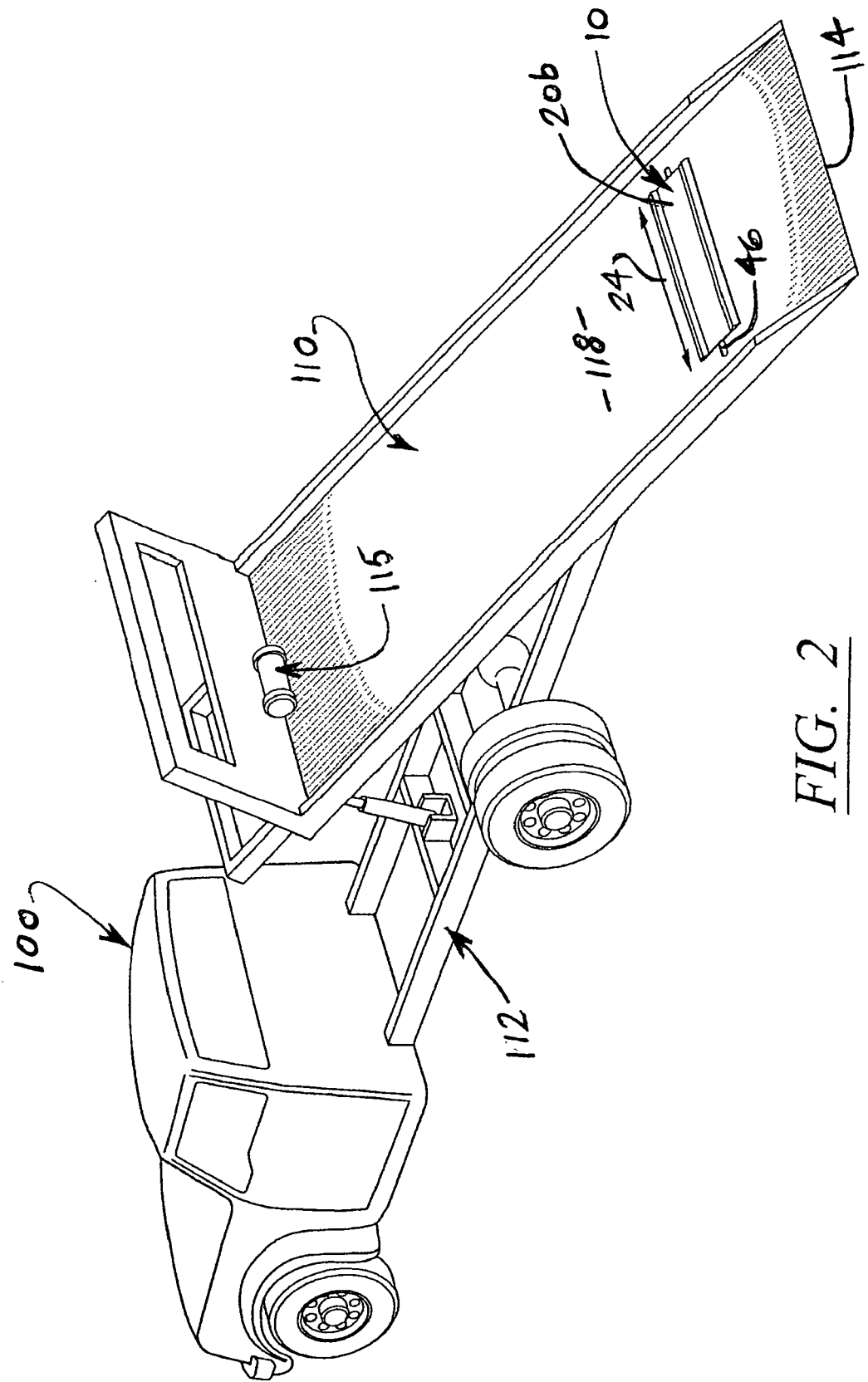
FIG. 2 is a rear perspective view of a roll-back truck shown with the platform in a rearward extended and elevated position for loading or unloading a vehicle thereon, and illustrating another embodiment of the load leveling system of the present invention incorporating a single slide plate.
Figure 3:
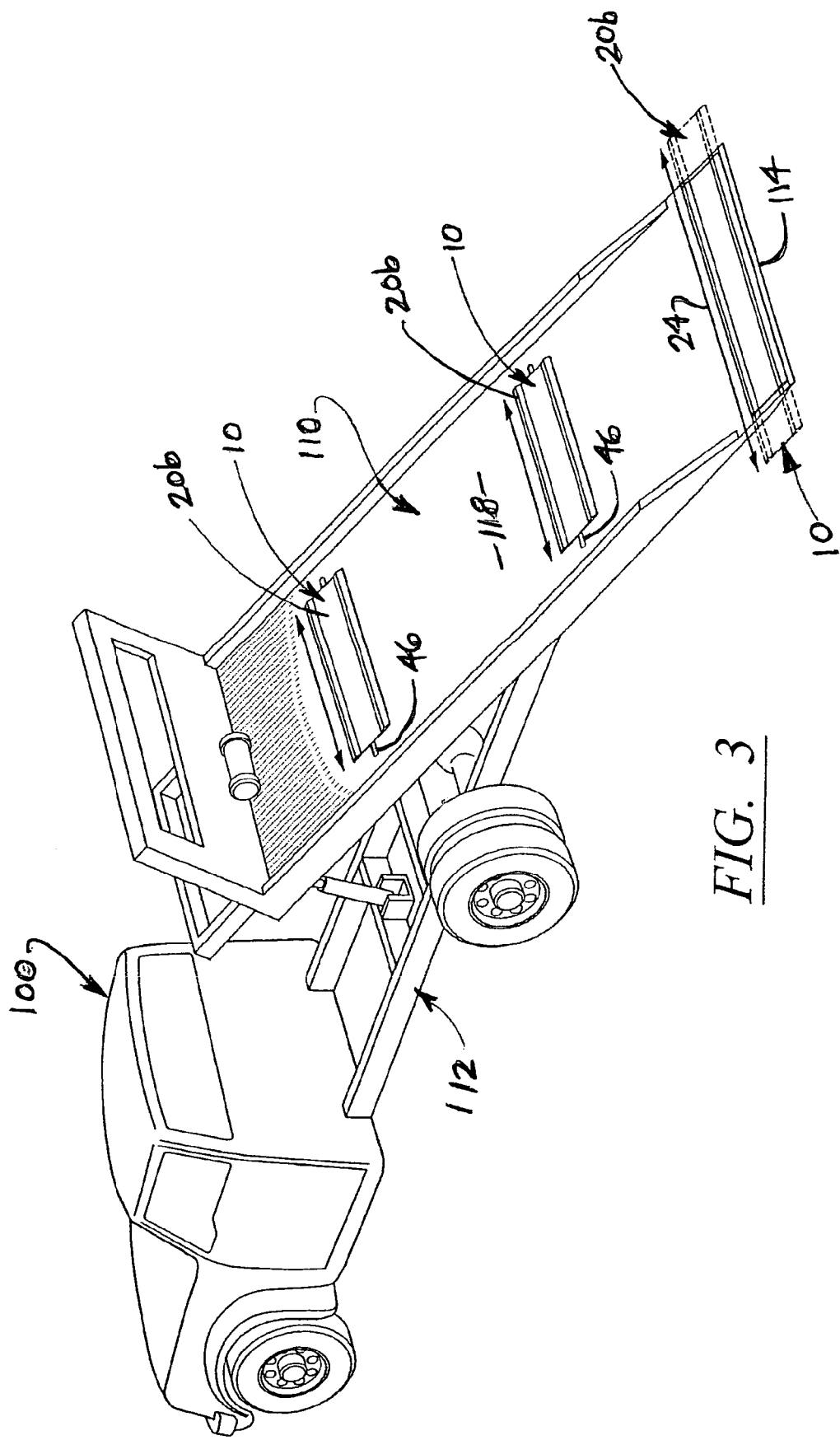
FIG. 3 is a rear perspective view of a roll-back truck shown with the platform in a rearward extended and elevated position for loading or unloading a vehicle thereon, and illustrating yet a further embodiment of the load leveling system of the present invention incorporating a plurality of wheel positioning slide plates at strategic positions along the plank of the platform.

FIGS. 1-3 show a typical roll-back truck 100 which has a platform 110 supported on a frame 112 and hydraulically operated to move both horizontally and vertically relative to the frame 112. More specifically, the platform 110 is normally maintained at a forward and horizontal position on the frame 112 so that the platform 110 is generally parallel to the underlying ground surface and the frame 112. When loading a vehicle or other load thereon, the platform 110 is moved rearwardly to a rearward extended position. Once reaching the rearward extended position, the forward end of the platform is lifted to angle the platform in a loading position so that the rear edge 114 of the platform is close to or in contact with the ground surface. A cable extending from winch 115 at the forward end of the platform is hooked to the frame structure of the vehicle or load whereupon operation of the winch 115 to wind the cable serves to pull the load onto the platform 110.

The load leveling system 10 of the present invention is used to reposition and properly align the vehicle or other load on the platform 110 as the load is pulled onto and upwardly along the length of the platform. In each of the embodiments described below, as well as other contemplated designs of the invention, the load leveling system 10 moves the load 130 transversely relative to the centerline 116 of the platform 110 (see FIGS. 4a-4b).

Referring now to FIG. 1, a first embodiment of the load leveling system 10 is shown and includes a pair of spaced plate members 20a movably fitted on the top surface 118 of the platform 110. The plate members 20a are movable, in unison, from side to side (i.e. transversely) relative to the longitudinal centerline 116 of the platform 110 as indicated by arrows 22. Each of the plate members 20a is adapted to receive a respective left or right tire 132 of a load vehicle 130 thereon during the loading process. Specifically, as the load vehicle 130 is pulled onto the platform, the forward left and right tires 132 of the vehicle 130 eventually ride onto the top of the plate members 20a. It should be noted that the plate members 20a can be moved to either the left or right, relative to the centerline of the platform, so that the tires of the load vehicle eventually rest on the top of the respective plate members 20a as the vehicle is initially pulled onto the platform 110. Once the tires of the load vehicle are resting on the plate members 20a, the plate members 20a can be moved to either the left or right in order to reposition the load vehicle relative to the platform so that the centerline 136 of the load vehicle 130 is pulled into better longitudinal alignment with the centerline 116 of the platform. Ideally, the load vehicle 130 should be positioned straight relative to the platform, and not at an angle, so that the longitudinal centerline 136 of the load vehicle 130 is parallel, and preferably in direct alignment with the longitudinal centerline 116 of the platform 110. Once the load vehicle is repositioned in better alignment with the platform, the loading process can continue whereupon the load vehicle 130 is continually pulled up along the length of the platform 110.

Referring to FIG. 2, another embodiment of the load leveling system 10 is shown to include a single plate member 20b movably supported on the top surface 118 of the platform 110 and extending transversely, generally perpendicular to the longitudinal centerline 116 of the platform 110. The overall length of the plate member 20b is less than the transverse width of the platform surface 118 to permit room for the plate member 20b to be moved, in a sliding action, transversely to the left or the right relative to the centerline 116, as indicated by arrows 24. This particular embodiment provides a greater surface area of the plate member 20b for contact with the tires 132 of the load vehicle 130, thereby insuring that the tires 132 will ride onto the plate member 20b when pulling the load vehicle onto the platform 110, regardless of the angle of approach.

FIG. 3 shows yet a further embodiment of the load leveling system 10 of the present invention. In this embodiment, the load leveling system 10 includes three plate members 20b, similar to that described in connection with the embodiment of FIG. 2. In the embodiment of FIG. 3, the plate members 20b are strategically positioned at various locations along the length of the platform 110. Specifically, one plate member 20b is positioned just forward of the rear edge 114 of the platform to engage the tires 132 of load vehicle 130 as soon as the vehicle is pulled onto the platform. As seen in FIG. 3, this first plate member 20b, adjacent the rear edge 114, is able to extend out beyond the width of the platform at either side and is movable transversely relative to the centerline, as indicated by the arrow 24. This allows for repositioning of the load vehicle from an awkward approach angle or in instances wherein either the left or right front tire 132 of the load vehicle is off to the side of the platform upon initial approach. Thus, the first plate member 20b is able to pull the front end of the load vehicle in better alignment so that both the left and right tires of the load vehicle ride onto the platform during the initial loading process.

The embodiment of FIG. 3 includes additional plate members 20b positioned towards the center area of the platform and towards the forward end of the platform. These additional plate members 20b allow for further adjustment and repositioning of the load vehicle throughout the loading process. Once the load vehicle is fully on the platform 110, the middle and forward plate members can be used to shift the entire load vehicle either to the left or right relative to the centerline of the platform 110. This allows for the vehicle to be loaded to a higher side of the platform in the event the truck 100 is positioned on an incline, such as along the embankment of a highway. Then, once the roll-back truck 100 is moved onto level surface, the loaded vehicle on the platform can be readjusted towards the centerline of the platform to properly level and position the load for safe transport.

In each of the embodiments described above, the plate members 20a, 20b are preferably formed of a single sheet of metal (e.g. galvanized steel, stainless steel or aluminum). Further, each of the plate members 20a, 20b is provided with a forward lip 26 and rear lip 28. The angled lips 26, 28 help to maintain the tires 132 of the loaded vehicle 130 on the top surface of the plate members 20a, 20b. To further support the tires 132 on the plate members 20a, 20b and to prevent slipping, wheel blocks 30 may be provided for attachment to the top side of the plate members 20a, 20b on the outboard sides of the tires 132 of the load vehicle. As shown in FIG. 6, the wheel blocks 30 may be provided with pegs 32 for receipt through correspondingly positioned holes 34 formed through the plate members 20a, 20b. As seen in FIG. 6, an arrangement of holes 34 are provided for adjusted positioning of the wheel block 30 to accommodate for the position of the tires 132 on the plate members 20a, 20b, as well as the variations in wheel base and tire size of different load vehicles.

The plate members 20a, 20b shown and described in connection with the embodiments of FIGS. 1-3, may be moved transversely by various means. In a preferred embodiment, the plate members 20a, 20b are moved by hydraulic rams 40 installed below the platform. The hydraulic rams 40 are linked to a connecting rod 42 which connects the plate members 20a or 20b. More specifically, the plate members 20a, 20b are slidably fitted to the platform 110 with a connector 44 extending down from an underside of the respective plate members 20a, 20b and through a slot 46 formed through the platform 110. The connectors 44 connect between the plate members 20a, 20b and the connecting rod 42. Accordingly, operation of the hydraulic rams 40 serves to move the connecting rod 42 transversely, back and forth, relative to the longitudinal centerline 116 of the platform, and thereby driving sliding movement of the plate members 20a or 20b relative to the top surface 118 of the platform.

While the present invention has been shown and described in accordance with various preferred and practical embodiments thereof, it is recognized that departures from the instant disclosure are contemplated within the spirit and scope of the present invention. For instance, the plate members described above may be moved by means other than hydraulic. Further, other structure may be used, in lieu of the plate members, to move the load relative to the platform. For example, a conveyor belt arrangement or rollers (e.g. cylinder rollers or ballbearings) may be used to shift the load relative to the platform. Accordingly, it is the spirit and intent of the present invention to provide means on the platform of a roll-back truck to shift the load relative to the platform during the loading process.

While the invention has been shown and described in accordance with several preferred and practical embodiments, it is recognized that departures from the instant disclosure are fully contemplated within the spirit and scope of the invention which is not to be limited except as defined in the following claims as interpreted under the Doctrine of Equvalents.

What is claimed is:

1. A system for repositioning and aligning a vehicle loaded onto a roll-back truck having a tilting platform with a front end, a rear edge, a top surface, longitudinal sides and a longitudinal center line extending from the front end to the rear edge between the sides, said system comprising:
   a tire engagement member on the top surface of the platform for engaging at least one tire of the vehicle being loaded on the platform, and said tire engagement member being transversely movable relative to the platform;
   a drive assembly for driving transverse movement of said tire engagement member; and
   whereby transverse movement of said tire engagement member causes the vehicle to be moved transversely on the platform relative to the longitudinal center line of the platform.

2. The system as recited in claim 1 wherein said tire engagement member is structured and disposed to simultaneously engage two tires of the vehicle.

3. The system as recited in claim 2 wherein said tire engagement member is structured and positioned to simultaneously engage two front tires of the vehicle.

4. The system as recited in claim 2 wherein said tire engagement member is structured and positioned to simultaneously engage two rear tires of the vehicle.

5. The system as recited in claim 1 further comprising:
   a plurality of said tire engagement members, each of said plurality of tire engagement members being structured, positioned and disposed for engaging a correspondingly positioned one tire of the vehicle.

6. The system as recited in claim 1 further comprising a plurality of said tire engagement members including a first one of said tire engagement members positioned towards the front end of the platform and a second one of said tire engagement members positioned towards the rear edge of the platform.

7. The system as recited in claim 1 further comprising at least three tire engagement members including a first tire engagement member towards the front end of the platform, a second tire engagement member at a middle section of the platform, and a third tire engagement member towards the rear edge of the platform.

8. The system as recited in claim 1 wherein said tire engagement member is positioned near the rear edge of the platform, and further wherein said tire engagement member is structured to extend transversely outward beyond the longitudinal sides of the platform.

9. The system as recited in claim 6 wherein said second one of said tire engagement members is structured and disposed to extend transversely outward beyond the longitudinal sides of the platform.

10. The system as recited in claim 1 wherein said tire engagement member is a plate movably positioned on the top surface of the platform and said plate being structured and disposed to receive the tread surface of at least one tire of the vehicle thereon.

11. The system as recited in claim 1 wherein the drive assembly is hydraulic and includes at least one hydraulic ram linked to said tire engagement member for driving transverse movement thereof.

12. The system as recited in claim 1 wherein said tire engagement member is structured and disposed to receive the tread surface of at least one tire of the vehicle thereon.

13. The system as recited in claim 12 wherein said tire engagement member is further structured and disposed to engage at least one side of at least one tire of the vehicle.

14. A system for repositioning and aligning a vehicle loaded onto a roll-back truck having a tilting platform with a front end, a rear edge, a top surface, longitudinal sides and a longitudinal center line extending from the front end to the rear edge between the sides, said system comprising:
   at least one plate member movably supported on the top surface of the platform, said at least one plate member being structured and disposed for receiving the ground engaging tread surface of at least one tire of the vehicle thereon, and said at least one plate member being transversely movable relative to the platform;
   a drive assembly for driving transverse movement of said at least one plate member and including at least one hydraulic ram linked to said at least one plate member; and
   whereby transverse movement of said at least one plate member causes the vehicle to be moved transversely on the platform relative to the center line of the platform when at least one tire of the vehicle is received on said at least one plate member.

15. The system as recited in claim 14 wherein said at least one plate member is structured, positioned and disposed to simultaneously engage two tires of the vehicle.

16. The system as recited in claim 14 further comprising:
   a plurality of said plate members, each of said plurality of said plate members being structured, positioned and disposed for receiving the ground engaging tread surface of a correspondingly positioned tire of the vehicle thereon.

17. The system as recited in claim 14 further comprising:
   a plurality of said plate members including a first one of said plate members positioned towards the front end of the platform and a second one of said plate members positioned towards the rear edge of the platform.

18. The system as recited in claim 14 wherein said at least one plate member is positioned near the rear edge of the platform, and further, wherein said at least one plate member is structured and disposed to extend transversely outward beyond the longitudinal sides of the platform.

19. The system as recited in claim 14 further comprising:
   at least one wheel block removably attachable to said at least one plate member for engaging a side of a tire of the vehicle received on said at least one plate member.

* * * * *